(12) United States Patent
Wang et al.

(10) Patent No.: US 11,570,743 B2
(45) Date of Patent: Jan. 31, 2023

(54) CONTROL SYSTEM, CONTROL PROGRAM, CONTROL METHOD, AND TRANSMITTER USED IN CONTROL SYSTEM

(71) Applicant: PANASONIC INTELLECTUAL PROPERTY MANAGEMENT CO., LTD., Osaka (JP)

(72) Inventors: Yanfeng Wang, Osaka (JP); Nobuo Matsuo, Hyogo (JP); Masayuki Amano, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/970,826

(22) PCT Filed: Feb. 12, 2019

(86) PCT No.: PCT/JP2019/004898
§ 371 (c)(1),
(2) Date: Aug. 18, 2020

(87) PCT Pub. No.: WO2019/163583
PCT Pub. Date: Aug. 29, 2019

(65) Prior Publication Data
US 2021/0120516 A1 Apr. 22, 2021

(30) Foreign Application Priority Data
Feb. 21, 2018 (JP) .............................. JP2018-029182

(51) Int. Cl.
*H04W 84/12* (2009.01)
*H04W 64/00* (2009.01)
(Continued)

(52) U.S. Cl.
CPC .............. *H04W 64/003* (2013.01); *G01S 1/68* (2013.01); *G01S 5/0226* (2013.01); *G01S 5/14* (2013.01)

(58) Field of Classification Search
CPC ......... H04W 4/029; H04W 4/80; H04W 4/02; H04W 56/0025; H04W 56/0035;
(Continued)

(56) References Cited

U.S. PATENT DOCUMENTS

2002/0016180 A1* 2/2002 Derosier ............... H04W 52/24
455/434
2010/0130245 A1* 5/2010 Iseda ................... H04W 52/143
455/522
(Continued)

FOREIGN PATENT DOCUMENTS

JP  2005-321853 A  11/2005
JP  2007-110760 A  4/2007
(Continued)

OTHER PUBLICATIONS

International Search Report and Written Opinion issued in International Patent Application No. PCT/JP2019/004898, dated May 7, 2019; with partial English translation.
(Continued)

*Primary Examiner* — Quan M Hua
(74) *Attorney, Agent, or Firm* — McDermott Will & Emery LLP

(57) ABSTRACT

A control system includes a communications unit, an acquisition unit, and an output unit. The communications unit communicates with a transmitter that transmits a wireless signal. The acquisition unit acquires location information about a location of the transmitter based on the wireless signal that has been transmitted from the transmitter and received by the communications unit. The output unit has an
(Continued)

instruction signal including adjustment information transmitted, in accordance with the location information acquired by the acquisition unit, from the communications unit to the transmitter. The adjustment information is used to vary at least one of a time interval at which the transmitter transmits the wireless signal or transmission power with which the transmitter transmits the wireless signal.

11 Claims, 4 Drawing Sheets

(51) Int. Cl.
    *G01S 1/68*     (2006.01)
    *G01S 5/02*     (2010.01)
    *G01S 5/14*     (2006.01)

(58) Field of Classification Search
CPC ............... H04W 56/006; H04W 92/10; H04W 4/021; H04W 4/33; H04W 40/244; H04W 28/16; H04W 52/18; H04W 52/54; H04W 52/58; H04W 64/00; H04W 72/042; H04W 72/044; H04W 72/048; H04W 74/0833; H04W 8/22; H04W 88/005; H04W 52/0216; H04W 52/0229; H04W 52/028; H04W 64/003; H04W 76/27; H04W 4/023; H04B 17/318

See application file for complete search history.

(56) References Cited

U.S. PATENT DOCUMENTS

| | | | |
|---|---|---|---|
| 2013/0279370 A1* | 10/2013 | Eitan | A61N 1/37282 370/254 |
| 2015/0355308 A1 | 12/2015 | Ishida et al. | |
| 2016/0065719 A1 | 3/2016 | Jeong et al. | |
| 2017/0026794 A1 | 1/2017 | Baker et al. | |
| 2017/0038787 A1* | 2/2017 | Baker | H05B 47/19 |
| 2017/0064652 A1 | 3/2017 | Kela et al. | |

FOREIGN PATENT DOCUMENTS

| | | |
|---|---|---|
| JP | 2009-003872 A | 1/2009 |
| JP | 5503774 B1 | 5/2014 |
| JP | 2016-170005 A | 9/2016 |
| JP | 2017-519396 A | 7/2017 |
| JP | 2017-134711 A | 8/2017 |
| JP | 2017-528991 A | 9/2017 |
| JP | 2019-007863 A | 1/2019 |

OTHER PUBLICATIONS

Notice of Reasons for Refusal dated Aug. 3, 2021, in the corresponding Japanese Patent Application No. 2020-501687; with English translation.

* cited by examiner

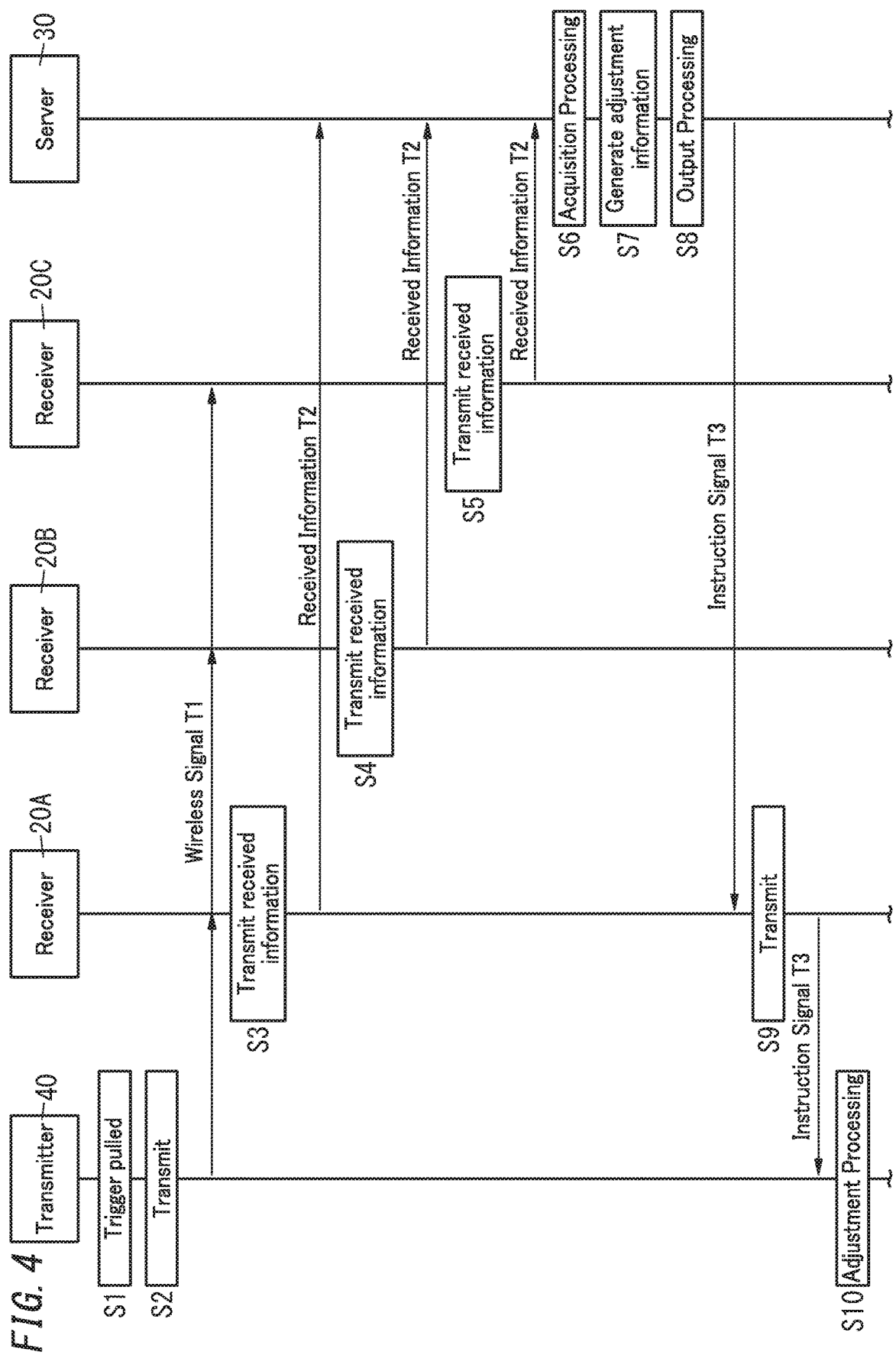

CONTROL SYSTEM, CONTROL PROGRAM, CONTROL METHOD, AND TRANSMITTER USED IN CONTROL SYSTEM

CROSS-REFERENCE OF RELATED APPLICATIONS

This application is the U.S. National Phase under 35 U.S.C. § 371 of International Patent Application No. PCT/JP2019/004898, filed on Feb. 12, 2019, which in turn claims the benefit of Japanese Application No. 2018-029182, filed on Feb. 21, 2018, the entire disclosures of which Applications are incorporated by reference herein.

TECHNICAL FIELD

The present disclosure generally relates to a control system, a control program, a control method, and a transmitter for use in the control system. More particularly, the present disclosure relates to a control system for controlling a transmitter that transmits a wireless signal, and a control program, a control method, and a transmitter for use in the control system.

BACKGROUND ART

An indoor positioning system has been known which includes a positioning server (control system) and a positioning client (transmitter) (see, for example, Patent Literature 1).

In the indoor positioning system of Patent Literature 1, the positioning server receives, from the positioning client, sensor information, such as radio wave strength and acoustic wave intensity, collected indoors by the positioning client, thus determining, based on the sensor information thus received, an estimated location of the positioning client.

In the indoor positioning system of Patent Literature 1, to determine an estimated location of the positioning client, the positioning server makes the positioning client transmit the sensor information that the positioning client has collected. The positioning client consumes power in communication with the positioning server. The positioning client is a mobile telecommunications device such as a smartphone, and therefore, there has been an increasing demand for cutting down its power consumption.

CITATION LIST

Patent Literature

Patent Literature 1: JP 2016-170005 A

SUMMARY OF INVENTION

It is therefore an object of the present disclosure to provide a control system, a control program, a control method, and a transmitter for use in the control system, all of which are configured or designed to cut down the power consumption of the transmitter.

A control system according to an aspect of the present disclosure includes a communications unit, an acquisition unit, and an output unit. The communications unit communicates with a transmitter that transmits a wireless signal. The acquisition unit acquires location information about a location of the transmitter based on the wireless signal that has been transmitted from the transmitter and received by the communications unit. The output unit has an instruction signal transmitted, in accordance with the location information acquired by the acquisition unit, from the communications unit to the transmitter. The instruction signal includes adjustment information that is used to vary at least one of a time interval at which the transmitter transmits the wireless signal or transmission power with which the transmitter transmits the wireless signal.

A control program according to another aspect of the present disclosure is designed to cause a computer system to perform acquisition processing and output processing. The acquisition processing includes acquiring location information about a location of a transmitter based on a wireless signal that has been transmitted from the transmitter configured to transmit the wireless signal and received by a communications unit configured to communicate with the transmitter. The output processing includes having an instruction signal transmitted, in accordance with the location information acquired through the acquisition processing, from the communications unit to the transmitter. The instruction signal includes adjustment information that is used to vary at least one of a time interval at which the transmitter transmits the wireless signal or transmission power with which the transmitter transmits the wireless signal.

A control method according to still another aspect of the present disclosure includes acquisition processing and output processing. The acquisition processing includes acquiring location information about a location of a transmitter based on a wireless signal that has been transmitted from the transmitter configured to transmit the wireless signal and received by a communications unit configured to communicate with the transmitter. The output processing includes having an instruction signal transmitted, in accordance with the location information acquired through the acquisition processing, from the communications unit to the transmitter. The instruction signal includes adjustment information that is used to vary at least one of a time interval at which the transmitter transmits the wireless signal or transmission power with which the transmitter transmits the wireless signal.

A transmitter according to yet another aspect of the present disclosure is used in the control system described above. The transmitter includes a transmitter-end communications unit and a control unit. The transmitter-end communications unit communicates with the communications unit of the control system. The control unit varies, according to the adjustment information that the transmitter-end communications unit has received from the control system, at least one of the time interval or the transmission power.

BRIEF DESCRIPTION OF DRAWINGS

FIG. 4 is a sequence chart illustrating an exemplary operation of the control system.

DESCRIPTION OF EMBODIMENTS

First Embodiment

(1) Overview

Figure 1:
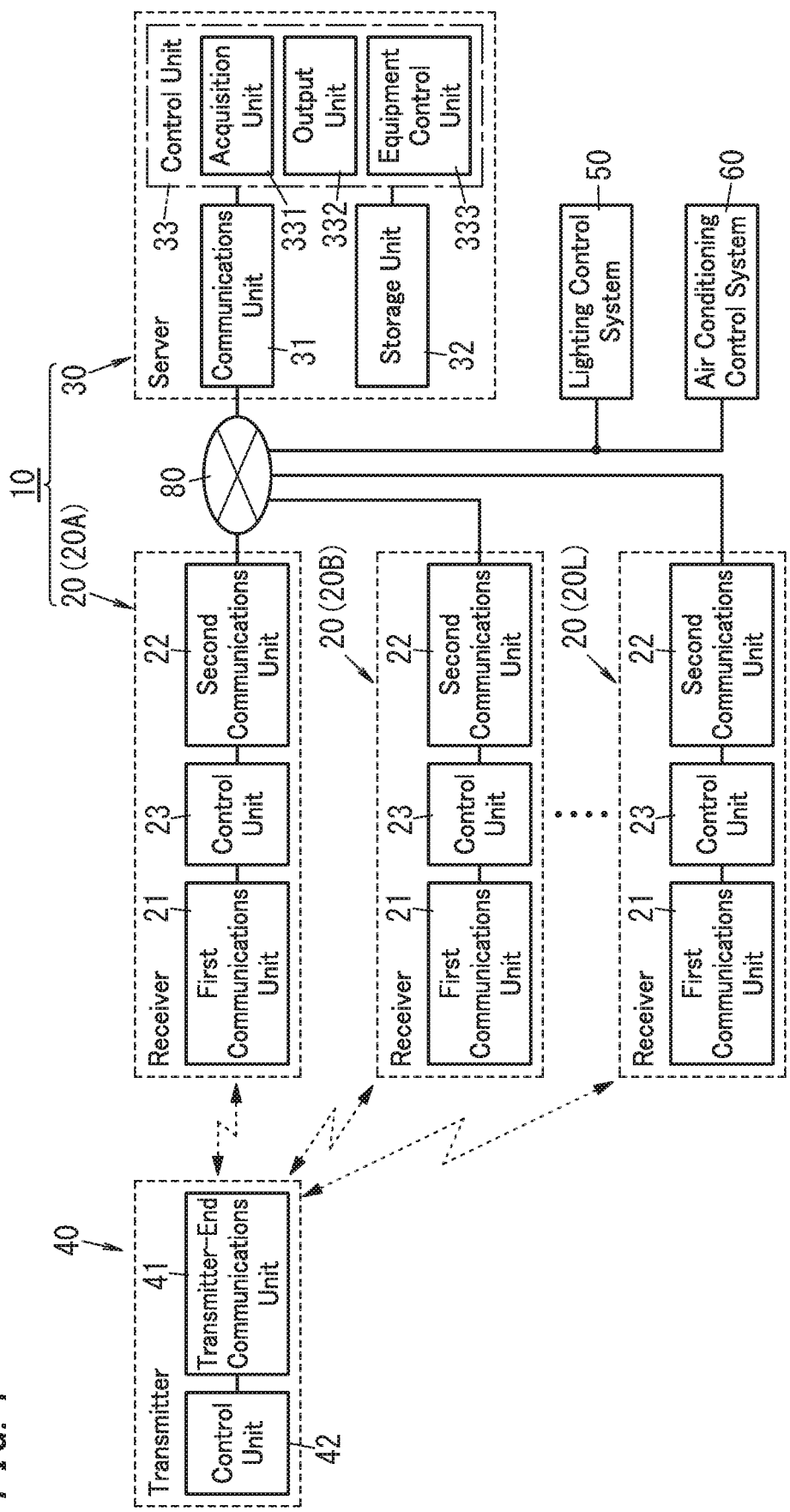
FIG. 1 is a block diagram illustrating an overall system including a control system according to an exemplary embodiment of the present disclosure.

As shown in FIG. 1, a control system 10 according to this embodiment includes a communications unit (first communications unit 21), an acquisition unit 331, and an output unit 332. The communications unit (first communications unit 21) communicates with a transmitter 40 that transmits a wireless signal. The acquisition unit 331 acquires location information about a location of the transmitter 40 based on the wireless signal that has been transmitted from the transmitter 40 and received by the communications unit (first communications unit 21). The output unit 332 has an instruction signal transmitted, in accordance with the location information acquired by the acquisition unit 331, from the communications unit (first communications unit 21) to the transmitter 40. The instruction signal includes adjustment information that is used to vary at least one of a time interval at which the transmitter 40 transmits the wireless signal or transmission power with which the transmitter 40 transmits the wireless signal.

In this case, the location information about the location of the transmitter 40 may be the coordinates of the location where the transmitter 40 is located or a piece of information indicating whether or not the transmitter 40 is located within a predetermined detection range. Alternatively, the location information may also be information about the location where the transmitter 40 is currently located, the distance traveled per unit time by the transmitter 40 (i.e., a variation with time in the location where the transmitter 40 is located), or information indicating the history of locational changes of the transmitter 40 during a predetermined period. As used herein, the predetermined period may be on the order of a few hours to several days, for example, and is a period long enough to trace the behavioral pattern of the user who carries the transmitter 40 with him or her.

As can be seen, the output unit 332 makes the communications unit (first communications unit 21) transmit an instruction signal including adjustment information to the transmitter 40, thus allowing at least one of a time interval or transmission power at/with which the transmitter 40 transmits the wireless signal to be varied. Thus, the output unit's 332 making the transmitter 40 transmit an instruction signal including either adjustment information to extend the time interval at Which the transmitter 40 transmits the wireless signal or adjustment information to lower the transmission power with which the transmitter 40 transmits the wireless signal allows the power consumption of the transmitter 40 to be cut down. Consequently, a control system 10 with the ability to cut down the power consumption of the transmitter 40 may be provided.

Also, a transmitter 40 for use in the control system 10 according to this embodiment includes a transmitter-end communications unit 41 and a control unit 42. The transmitter-end communications unit 41 communicates with the communications unit (first communications unit 21) of the control system 10. The control unit 42 varies, according to the adjustment information that the transmitter-end communications unit 41 has received from the control system 10, at least one of the time interval or transmission power to transmit the wireless signal.

Thus, the transmitter 40 with such a configuration allows at least one of the time interval or transmission power at/with which the wireless signal is transmitted to be varied according to the adjustment information that the transmitter-end communications unit 41 has received from the control system 10. Thus, the output unit's 332 making the transmitter 40 transmit an instruction signal including either adjustment information to extend the time interval at which the transmitter 40 transmits the wireless signal or adjustment information to lower the transmission power with which the transmitter 40 transmits the wireless signal allows the power consumption of the transmitter 40 to be cut down.

(2) Details

Figure 2:
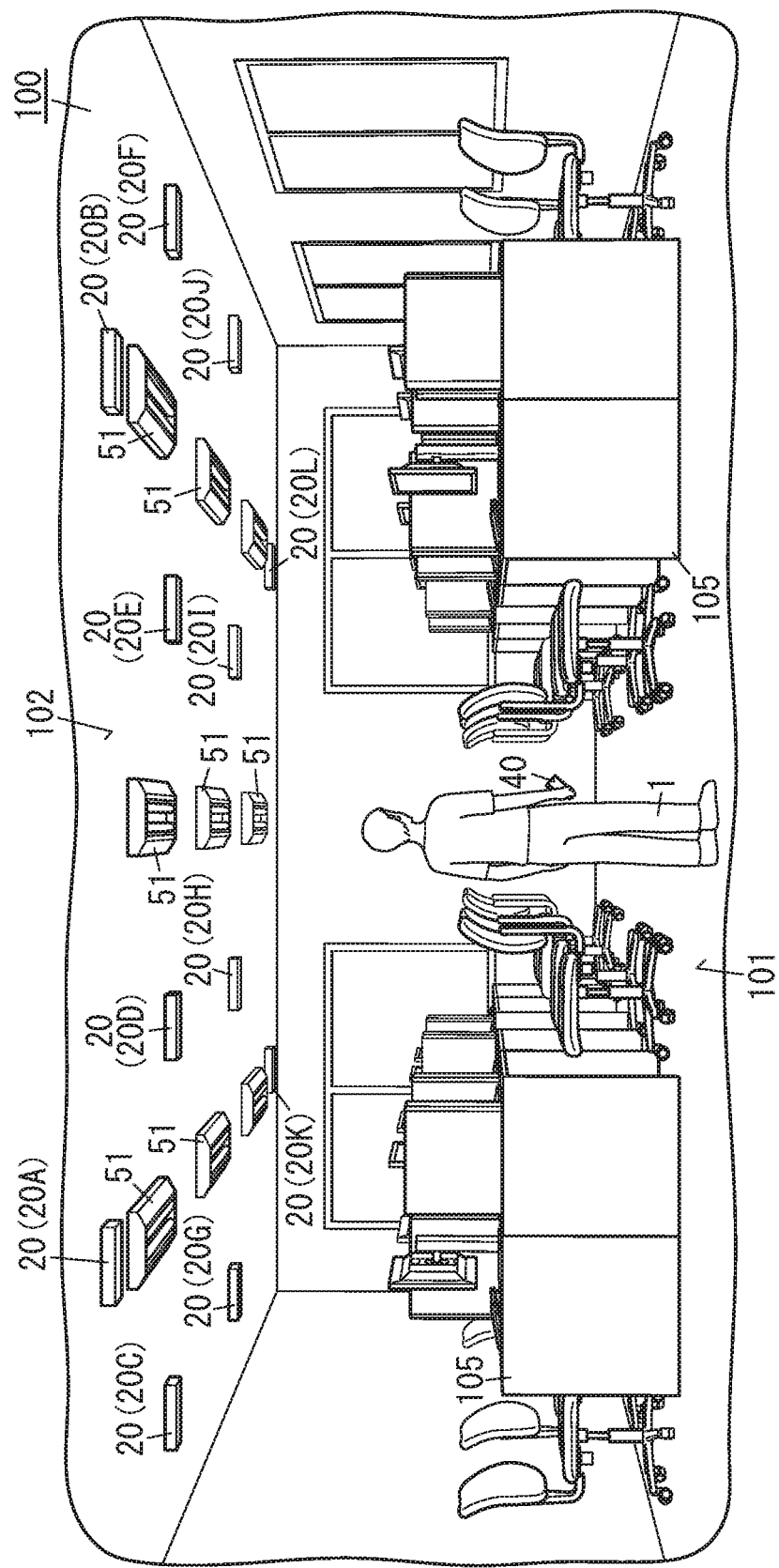
FIG. 2 is a schematic representation depicting a room of a facility to which the control system is applied.
Figure 3:
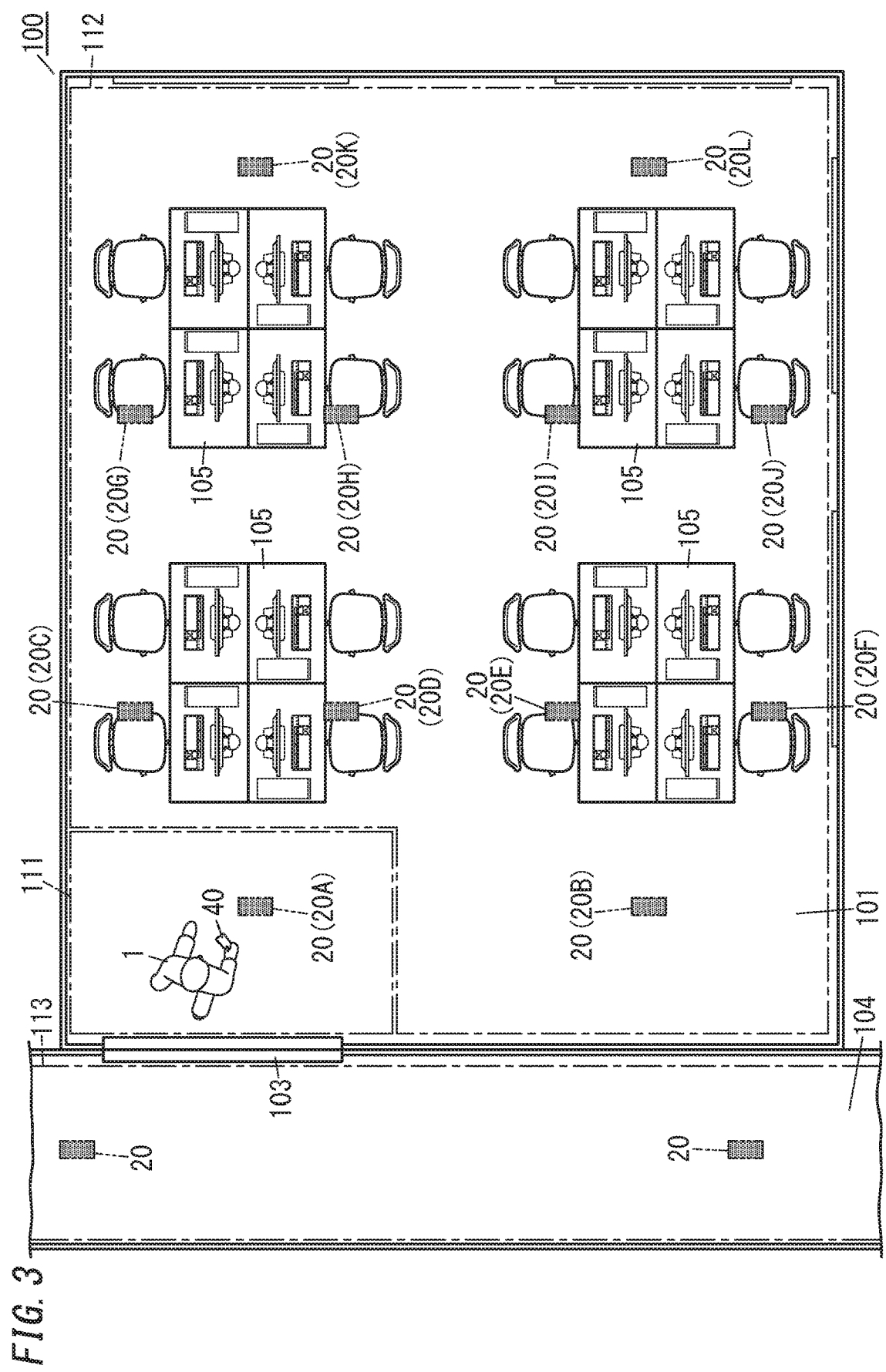
FIG. 3 is a plan view of the room of the facility to which the control system is applied.

Next, a control system 10 according to this embodiment will be described with reference to FIGS. 1-3. Note that in FIG. 3, the two-dot chains indicating the boundary between a plurality of areas are shown there just for the sake of convenience, and actually nonexistent.

A control system 10 according to this embodiment includes a plurality of receivers 20 and a server 30.

The control system 10 according to this embodiment may be used as a local positioning system (ITS) for determining an estimated location of the transmitter 40 in a target area. Examples of the "target areas" are various types of facilities including office buildings, factories, shopping malls, art museums, museums, amusement facilities, theme parks, hotels, and dwelling houses. The target area refers to a site and a building constructed on the site. The target area may also refer to an area where humans move in a moving vehicle such as a ship or a railway train. For example, inside a building or a moving vehicle or in an underground facility or a tunnel, it often is difficult to receive radio waves from an artificial satellite used in a global navigation satellite system such as the Global Positioning System (GPS) and determine the estimated location by the GPS. A local positioning system including the control system 10 according to this embodiment is used to determine an estimated location of the transmitter 40 in a target area that the radio waves are difficult to reach from an artificial satellite used in the GPS.

In the following description of an exemplary embodiment, a situation where the control system 10 is used as a local positioning system for determining an estimated location of the transmitter 40 in a facility 100 such as an office building (see FIGS. 2 and 3) will be described by way of illustrative example.

A plurality of receivers 20 are arranged on the ceiling 102 of a room 101 of a facility 100. A local positioning system including the control system 10 according to this embodiment is used to determine an estimated location of the transmitter 40 in the room 101 where the plurality of receivers 20 are installed. In the room 101, a plurality of office desks 105 and various other pieces of office equipment are arranged, and light fixtures 51 are installed on the ceiling of the room 101. Note that FIG. 3 is a plan view of the room 101. In FIG. 3, the receivers 20 installed on the ceiling 102 of the room 101 are illustrated in phantom.

Next, respective constituent elements of the local positioning system including the control system 10 will be described.

(2.1) Configuration for Transmitter

The transmitter 40 may be a mobile telecommunications device carried by the user 1 of the facility 100 with him or her. The transmitter 40 may be a telecommunications device such as a smartphone. However, this is only an example and should not be construed as limiting. Alternatively, the transmitter 40 may also be a mobile telecommunications device such as a tablet or may also be a transmitter such as a tag dedicated to a local positioning system.

The transmitter 40 includes a transmitter-end communications unit 41 and a control unit 42.

The transmitter-end communications unit 41 has a communication capability of establishing wireless communication with the plurality of receivers 20 using radio waves. The transmitter-end communications unit 41 establishes wireless communication in compliance with a predetermined communications protocol. In this embodiment, the transmitter-end communications unit 41 establishes wireless communication in compliance with the Bluetooth Low Energy (BLE®) standard. The transmitter-end communications unit 41 wirelessly transmits a wireless signal (beacon signal) such as a one called "advertisement packet" at a predetermined time interval and with predetermined transmission power. The transmitter-end communications unit 41 receives an instruction signal transmitted from the control system 10. The instruction signal includes adjustment information for use to vary at least one of the time interval at which the transmitter 40 transmits the wireless signal or the transmission power with which the transmitter 40 transmits the wireless signal. The time interval and transmission power at/with which the transmitter-end communications unit 41 transmits the wireless signal (such as an advertisement packet) are controlled by the control unit 42. Note that the communications protocol followed by the transmitter-end communications unit 41 does not have to be the BLE® but may also be a Wi-Fi® or any other suitable communications protocol.

The control unit 42 varies, in accordance with the adjustment information that the transmitter-end communications unit 41 has received from the control system 10, at least one of the time interval or transmission power at/with which the transmitter-end communications unit 41 transmits the wireless signal (such as an advertisement packet). The control unit 42 may be implemented, for example, as a microcomputer including a processor and a memory. In other words, the control unit 42 is implemented as a computer system including a processor and a memory. The processor's execution of an appropriate program allows the computer system to function as the control unit 42. The program may be stored in advance in the memory. Alternatively, the program may also be downloaded through a telecommunications line such as the Internet or be distributed after having been recorded in some non-transitory storage medium such as a memory card.

In this example, identification information is assigned on an individual basis to each of the transmitters 40. The identification information is stored in, for example, a non-volatile memory of the transmitter 40. Even though only a single transmitter 40 is illustrated in FIGS. 1-3, the number of the transmitters 40 does not have to be one but may also be plural. If a plurality of users 1 use the facility 100, each of those users 1 uses or carries his or her own transmitter 40 with him or her. That is to say, the transmitters 40 correspond one to one to the users 1 and the identification information of each transmitter 40 is associated uniquely with one of the users 1. Thus, the identification information of the transmitters 40 carried by the users 1 varies from one user 1 to another.

In the transmitter 40, installed is a transmission program that is designed to make the transmitter-end communications unit 41 transmit, when the transmitter 40 enters the target area (such as an area covering the facility 100) for the local positioning system, a wireless signal (such as an advertisement packet) at a predetermined time interval and with predetermined transmission power. For example, a beacon terminal provided at the entrance of the facility 100 transmits, at regular intervals, a beacon signal including information indicating that the local positioning system is now available. On receiving the beacon signal from this beacon terminal, the transmitter 40 starts the transmission program. This causes, when the transmitter 40 enters the target area for the local positioning system, the transmitter 40 to transmit a wireless signal (such as an advertisement packet) including identification information assigned to the transmitter 40 at a predetermined time interval and with predetermined transmission power. In this example, an initial value of the time interval to transmit the wireless signal is set at 0.1 ms, for example. Note that when determining that the transmitter 40 should have gone out of the facility 100 while the transmission program is being started, the transmitter 40 may stop transmitting the wireless signal. In this case, when finding that no response signals to a wireless signal have been received from the receiver 20 for a predetermined amount of time (which may be in the range from a few minutes to several ten minutes) since the transmission of the wireless signal, the transmitter 40 determines that the transmitter 40 itself should now be outside of the facility 100. Alternatively, the transmitter 40 may also determine, by any other method, that the transmitter 40 itself should now be outside of the facility 100.

(2.2) Configuration for Receiver

In this embodiment, a plurality of (e.g., twelve) receivers 20 are installed on the ceiling 102 of the room 101. In the following description, when referred to on an individual basis, the plurality of receivers 20 will be designated by the reference signs 20A-20L, respectively. However, when the statement applies to all of these receivers 20A-20L in common, those receivers 20A-20L will be collectively designated by the reference sign 20. Note that the receivers 20 are installed in the target area for the local positioning system, i.e., in places, other than the room 101, in the facility 100.

The receivers 20 each include a first communications unit 21, a second communications unit 22, and a control unit 23.

The first communications unit 21 has a communication capability of establishing wireless communication with the transmitter 40 using radio waves. The first communications unit 21 establishes wireless communication with the transmitter 40 in compliance with the same communications protocol. The first communications unit 21 has the capability of measuring, when receiving a wireless signal transmitted from the transmitter 40, the received signal strength indication (RSSI) of the wireless signal received. Note that the communications protocol that the first communications unit 21 follows does not have to be the BLE® but may also be any other communication protocol such as the Wi-Fi®.

The second communications unit 22 communicates with the server 30 over a communications network 80 inside the facility 100. The communications protocol that the second communications unit 22 follows may be compliant with the Ethernet® standard, for example, but may also be selected from various communications protocols. For example, the second communications unit 22 may also follow a wired communications protocol or a wireless communications protocol compliant with the Wi-Fi® standard, for example. Optionally, the second communications unit 22 may be connected to the communications network 80 via a router, a hub, or any other relay.

The control unit 23 may be implemented, for example, as a microcomputer including a processor and a memory. In other words, the control unit 23 is implemented as a computer system including a processor and a memory. The processor's execution of an appropriate program allows the computer system to function as the control unit 23. The program may be stored in advance in the memory. Alternatively, the program may also be downloaded through a telecommunications line such as the Internet or be distributed after having been recorded in some non-transitory storage medium such as a memory card. A receiver ID (identification) is assigned on an individual basis to each of the plurality of receivers 20 (20A-20L). The receiver ID is stored in a nonvolatile memory or any other storage of the receiver 20.

When the first communications unit 21 receives the wireless signal transmitted from the transmitter 40, the control unit 23 has a signal including information about the source transmitter 40 (this information will be hereinafter referred to as "received information") transmitted from the second communications unit 22 to the server 30 over the communications network 80. As used herein, the "received information" includes the received signal strength indication of the wireless signal transmitted from the transmitter 40, the identification information, included in the wireless sigma, of the transmitter 40, and the receiver ID of the receiver 20.

(2.3) Configuration for Server

The server 30 has the capability of determining, based on the result of reception of the wireless signal that the one or more receivers 20 have received from the transmitter 40, an estimated location of the transmitter 40.

The server 30 includes a communications unit 31, a storage unit 32, and a control unit 33.

The communications unit 31 communicates with the receivers 20 over the communications network 80. The communications unit 31 establishes communication in compliance with the same communication protocol as the second communications unit 22 of the receivers 20. The communications unit 31 may also communicate, over the communications network 80, with a lighting control system 50, an air conditioning control system 60, and other systems provided for the facility 100. The lighting control system 50 controls the light intensities of the light fixtures 51 installed on the ceiling of the room 101 (such that the light fixtures 51 are fully turn ON, turned up or down, or turned OFF). The air conditioning control system 60 may be installed in the room 101, for example, to control the temperature, humidity, and other parameters of the air inside the room 101.

The storage unit 32 includes a hard disk drive, an optical disk drive, and a memory card, for example. The storage unit 32 stores the respective receiver IDs of the plurality of receivers 20 installed in the target area, position information about their installation positions, and information about the history of the transmitter's 40 locations estimated in the target area. In this case, the position information about the installation positions of the receivers 20 includes coordinate information indicating the installation positions of the receivers 20 in a three-dimensional coordinate system, of which the origin is defined at a predetermined point inside the facility 100, for example. In addition, the storage unit 32 also stores three-dimensional data generated from building information modeling (BIM) data of the facility 100, for example, to represent the structure of the room 101.

The control unit 33 may be implemented, for example, as a microcomputer including a processor and a memory, in other words, the control unit 33 is implemented as a computer system including a processor and a memory. The processor's execution of an appropriate program (such as a control program to be described later) allows the computer system to function as the control unit 33. The program including the control program may be stored in advance in the storage unit 32. Alternatively, the program may also be downloaded through a telecommunications line such as the Internet or be distributed after having been recorded in some non-transitory storage medium such as a memory card.

The control unit 33 performs the functions of the acquisition unit 331 and the output unit 332.

The acquisition unit 331 performs the acquisition processing including acquiring, when the first communications unit 21 of any of the receivers 20 receives a wireless signal from the transmitter 40, location information about the location of the transmitter 40 based on the wireless signal that the first communications unit 21 has received. Specifically, when the first communications unit 21 of the receiver 20 receives the wireless signal from the transmitter 40, the receiver 20 outputs received information about the source transmitter 40 to the server 30. When the communications unit 31 is provided with the received information by the receiver 20, the acquisition unit 331 of the server 30 performs the acquisition processing including acquiring the location information about the location of the source transmitter 40. In this case, the received information that the communications unit 31 receives from the receiver 20 includes the received signal strength indication of the wireless signal that the receiver 20 has received, the identification information, included in the wireless signal, of the transmitter 40, and the receiver ID of the receiver 20. The acquisition unit 331 determines, by the receiver ID included in the received information, the installation position of the receiver 20 that has received the wireless signal from the transmitter 40. In addition, the acquisition unit 331 also determines, based on the received signal strength indication of the wireless signal received from the transmitter 40 and the transmission power of the transmitter 40, the degree of attenuation of the wireless signal and calculates, based on the degree of attenuation, the distance from the source transmitter 40 to the receiver 20 that has received the wireless signal. The acquisition unit 331 determines the installation position of the receiver 20 and the distance from the receiver 20 to the transmitter 40 with respect to each of the plurality of receivers 20 that have received the wireless signal from the single transmitter 40. Then, the acquisition unit 331 calculates, by the principle of triangulation, the coordinates indicating the location of the transmitter 40 that has transmitted the wireless signal. In this manner, the acquisition unit 331 acquires the current location of the transmitter 40 as location information. In other words, the location information about the location of the transmitter 40 includes information about the current location of the transmitter 40. In this embodiment, the current location of the transmitter 40 corresponds to the location of the transmitter 40 at a point in time when the receiver 20 receives the wireless signal from the transmitter 40.

The output unit 332 has an instruction signal transmitted from the communications unit 31 to the transmitter 40. The instruction signal includes adjustment information for use to vary, according to the location information acquired by the acquisition unit 331 about the transmitter 40 (such as information about its current location), the time interval and transmission power at/with which the transmitter 40 transmits the wireless signal. This allows the server 30 to adjust, based on the estimated current location of the transmitter 40, both the time interval and transmission power at/with which the transmitter 40 transmits the wireless signal. Optionally, the output unit 332 may have an instruction signal, including adjustment information for use to vary, according to the location information acquired by the acquisition unit 331 about the transmitter 40, the time interval or transmission power at/with which the transmitter 40 transmits the wireless signal, transmitted from communications unit 31 to the transmitter 40. This allows the server 30 to adjust, according to the estimated current location of the transmitter 40, either the time interval or transmission power at/with which the transmitter 40 transmits the wireless signal.

In addition, in this embodiment, the control unit 33 further performs the function of an equipment control unit 333.

The equipment control unit 333 makes the lighting control system 50 and the air conditioning control system 60 provided for the facility 100 operate in conjunction with each other in accordance with the location information acquired by the acquisition unit 331 about the transmitter 40. Specifically, the equipment control unit 333 controls the lighting control system 50 such that the intensity of the light emitted from the light fixture 51 installed in a first area covering the current location of the transmitter 40 in the room 101 is higher than that of the light emitted from the light fixture 51 installed in a second area other than the first area in the room 101. In addition, the equipment control unit 333 also controls the air conditioning control system 60 to a lesser degree in the first area covering the current location of the transmitter 40 in the room 101 than in the second area other than the first area in the room 101. Note that the pieces of equipment to be operated by the equipment control unit 333 in conjunction with each other in accordance with the location information about the transmitter 40 do not have to be the lighting control system 50 and the air conditioning control system 60. Alternatively, various other pieces of equipment provided for the facility 100 may be operated in combination in conjunction with the location information about the transmitter 40.

(2.4) Operation

Next, it will be described with reference to FIGS. 2-4 how the control system 10 according to this embodiment operates. In the following example, it will be described how the control system 10 operates when the user 1 who carries the transmitter 40 with him or her has entered the room 101 of the facility 100, When the user 1 who carries the transmitter 40 with him or her approaches the entrance of the facility 100 to enter the facility 100, the transmitter-end communications unit 41 of the transmitter 40 receives a beacon signal from a beacon terminal provided at the entrance of the facility 100. When the transmitter-end communications unit 41 receives the beacon signal from the beacon terminal, the control unit 42 of the transmitter 40 starts executing a transmission program, which is triggered by the reception of the beacon signal (in S1), to transmit a wireless signal such as an advertisement packet from the transmitter-end communications unit 41. This causes the transmitter-end communications unit 41 to transmit the wireless signal T1 with predetermined transmission power at every predetermined time interval (in S2).

The wireless signal T1 transmitted from the transmitter 40 is received by a single or a plurality of receivers 20 located around the transmitter 40. In the following description, a situation where the wireless signal T1 transmitted from the transmitter 40 is received by three receivers 20A, 20B, 20C will be described by way of illustrative example.

When receiving the wireless signal T1 transmitted from the transmitter 40, the first communications unit 21 of the receiver 20A measures the received signal strength indication of the wireless signal T1 and outputs the measured value of the received signal strength indication and identification information, included in the wireless signal T1, of the transmitter 40 to the control unit 23. In response, the control unit 23 of the receiver 20A has the received information T2, including the received signal strength indication of the wireless signal T1 received from the transmitter 40, the identification information of the transmitter 40, and the receiver ID of the receiver 20A, transmitted from the second communications unit 22 to the server 30 (in S3). Likewise, when the first communications unit 21 of each of the other receivers 20B, 20C receives the wireless signal T1 transmitted from the transmitter 40, the control unit 23 has the received information T2, including the received signal strength indication, the identification information of the transmitter 40, and the receiver ID, transmitted from the second communications unit 22 to the server 30 (in S4 and S5)

When the communications unit 31 of the server 30 is provided with the received information T2 from the receivers 20A, 20B, 20C, the acquisition unit 331 of the control unit 33 acquires the location information about the transmitter 40 (i.e., information about the current location of the transmitter 40) in accordance with the received information T2 provided by the receivers 20A, 20B, 20C.

The output unit 332 of the control unit 33 venerates, in accordance with the location information acquired by the acquisition unit 331 about the transmitter 40 and the current location of the transmitter 40, adjustment information for use to vary the time interval and transmission power at/with which the transmitter 40 transmits the wireless signal (in S7).

For example, if the transmitter 40 is currently located in a first area 111 adjacent to the entrance 103 of the room 101, the user 1 who carries the transmitter 40 with him or her may go deeper into the room 101 or may go out of the room 101. In such a situation, the server 30 suitably determines the estimated location of the transmitter 40 accurately enough at short time intervals.

On the other hand, if the transmitter 40 is currently located in a second area 112 (i.e., the area other than the first area 111) distant from the entrance 103 of the room 101, then the user 1 who carries the transmitter 40 with him or her is highly likely doing some type of work in the room 101 and is expected to move only a little. In that case, the time interval at which the server 30 determines the estimated location of the transmitter 40 (i.e., the time interval at which the transmitter 40 transmits the wireless signal) may be longer than when the transmitter 40 is currently located in the first area 111. In addition, when the transmitter 40 is currently located in the second area 112, the transmission power with which the transmitter 40 transmits the wireless signal may be lower than when the transmitter 40 is currently located in the first area 111.

Meanwhile, if the transmitter 40 is currently located in a third area 113, which is an area in a hallway 104, then the location of the user 1 who carries the transmitter 40 with him or her has nothing to do with the operation of the lighting control system 50 for controlling the light fixtures 51 in the room 101 or the air conditioning control system 60 for controlling the air conditioners in the room 101. Thus, when the transmitter 40 is currently located in the third area 113, the time interval at which the server 30 determines the estimated location of the transmitter 40 (i.e., the time interval at which the transmitter 40 transmits the wireless signal) may be longer than When the transmitter 40 is currently located in the second area 112. In addition, when the transmitter 40 is currently located in the third area 113, the transmission power with which the transmitter 40 transmits the wireless signal may be lower than when the transmitter 40 is currently located in the second area 112.

As can be seen, the output unit 332 of the control unit 33 adjusts, in accordance with the location information acquired by the acquisition unit 331 about the transmitter 40, the time interval and transmission power to transmit the wireless signal, depending on in which of the first, second, and third areas 111, 112, 113 the transmitter 40 is currently located. When finding the transmitter 40 currently located in the first area 111, the output unit 332 generates adjustment information that sets the time interval at which the transmitter 40 transmits the wireless signal at a first time interval t1 (of about 0.1 to a few seconds) and also sets its transmission power at a first power value P1. When finding the transmitter 40 currently located in the second area 112, the output unit 332 generates adjustment information that sets the time interval at which the transmitter 40 transmits the wireless signal at a second time interval t2 (of about 1 to 20 minutes) that is longer than the first time interval t1 and also sets its transmission power at a second power value P2 that is smaller than the first power value P1. When finding the transmitter 40 currently located in the third area 113, the output unit 332 generates adjustment information that sets the time interval at which the transmitter 40 transmits the wireless signal at a third time interval t3 that is longer than the second time interval t2 and also sets its transmission power at a third power value P3 that is smaller than the second power value P2. Thus, this allows, when the transmitter 40 is currently located in the second area 112 or the third area 113, the time interval at which the transmitter 40 transmits the wireless signal to be extended and the transmission power with which the transmitter 40 transmits the wireless signal to be lowered compared to when the transmitter 40 is currently located in the first area 111, thus cutting down the power consumption of the transmitter 40.

When generating the adjustment information, the output unit 332 performs output processing of having an instruction signal T3, including the adjustment information, transmitted from the communications unit 31 to the receiver 20A (in S8). Note that the output unit 332 needs to make the communications unit 31 transmit the instruction signal T3, including the adjustment information, to any one of the receivers 20A-20C that has received the wireless signal from the transmitter 40. Thus, the output unit 332 may make the communications unit 31 transmit the instruction signal T3 to the receiver 20B or the receiver 20C as well.

Then, when the second communications unit 22 of the receiver 20A receives the instruction signal T3, including the adjustment information, from the server 30, the control unit 23 has the instruction signal T3, including the adjustment information, transmitted wirelessly from the first communications unit 21 to the source transmitter 40 (in S9).

When the transmitter-end communications unit 41 of the transmitter 40 receives the instruction signal T3 transmitted from the receiver 20A, the control unit 42 performs the adjustment processing of adjusting, in accordance with the instruction signal T3 including the adjustment information, the time interval and transmission power at/with which the wireless signal is transmitted (in S10).

This allows the control system 10 according to this embodiment to adjust, in accordance with the location information about the location of the transmitter 40 (i.e., the current location of the transmitter 40), the time interval and transmission power at/with which the transmitter 40 transmits the wireless signal.

(3) Variations

Note that the embodiment described above is only an exemplary one of various embodiments of the present disclosure and should not be construed as limiting. Rather, the embodiment may be readily modified in various manners depending on a design choice or any other factor without departing from a true spirit and scope of the present disclosure. Optionally, the same functions as those of the control system 10 may also be implemented as a control method, a control program, or a non-transitory storage medium that stores the control program thereon. A control method according to an aspect includes acquisition processing and output processing. The acquisition processing includes acquiring location information about a location of a transmitter 40 based on a wireless signal that has been transmitted from the transmitter 40 configured to transmit the wireless signal and received by a communications unit (first communications unit 21) configured to communicate with the transmitter 40. The output processing includes having, in accordance with the location information acquired through the acquisition processing, an instruction signal transmitted from the communications unit (first communications unit 21) to the transmitter 40. The instruction signal includes adjustment information that is used to vary at least one of a time interval at which the transmitter 40 transmits the wireless signal or transmission power with which the transmitter 40 transmits the wireless signal. Also, a program according to another aspect is designed to cause a computer system to perform the acquisition processing and the output processing.

Next, variations of the exemplary embodiment described above will be enumerated one after another. Note that the variations to be described below may be adopted in combination as appropriate.

The control system 10 according to the present disclosure or the agent that carries out the control method according to the present disclosure includes a computer system. In that case, the computer system may include, as principal hardware components, a processor and a memory. The functions of the control system 10 according to the present disclosure or the agent that carries out the control method according to the present disclosure may be performed by making the processor execute a control program stored in the memory of the computer system. The control program may be stored in advance in the memory of the computer system. Alternatively, the control program may also be downloaded through a telecommunications line or be distributed after having been recorded in some non-transitory storage medium readable for the computer system. Examples of the non-transitory storage media readable for the computer system include a memory card, an optical disc, and a hard disk drive. The processor of the computer system may be made up of a single or a plurality of electronic circuits including a semiconductor integrated circuit (IC) or a largescale integrated circuit (LSI). Those electronic circuits may be either integrated together on a single chip or distributed on multiple chips, whichever is appropriate. Those multiple chips may be integrated together in a single device or distributed in multiple devices without limitation.

In the exemplary embodiment described above, the overall system including the control system 10 includes the receivers 20, the server 30, the lighting control system 50, and the air conditioning control system 60. However, neither the lighting control system 50 nor the air conditioning control system 60 is an essential constituent element for the control system 10. Thus, the lighting control system 50 and the air conditioning control system 60 may be omitted from the control system 10.

Also, the control system 10 is implemented as a combination of the receivers 20 and the server 30. However, this configuration is only an example and should not be construed as limiting. Alternatively, any of the receivers 20 may perform the function of the server 30. For example, the functions of the communications unit (first communications unit 21), the acquisition unit 331, and the output unit 332 may be aggregated together in any of the receivers 20. In that case, the server 30 may be omitted.

Optionally, the function of at least one of the acquisition unit 331 or the output unit 332 may be distributed in two or more systems. Also, the function of each of the acquisition unit 331 and the output unit 332 may be distributed in a plurality of devices. Furthermore, the function of at least part of the acquisition unit 331 and the output unit 332 may be implemented as a cloud (cloud computing).

Furthermore, in the exemplary embodiment described above, the output unit 332 generates the adjustment information based on the current location, acquired by the acquisition unit 331, of the transmitter 40. Alternatively, the output unit 332 may also generate the adjustment information based on the distance traveled per unit time by the transmitter 40 (i.e., the traveling velocity of the transmitter 40). That is to say, the location information acquired by the acquisition unit 331 may include information about the distance traveled per unit time by the transmitter 40.

The transmitter 40 transmits the wireless signal at the time interval set by the adjustment information, thus allowing the acquisition unit 331 of the server 30 to determine an estimated location of the transmitter 40 at the time interval to transmit the wireless signal. This enables the acquisition unit 331 to acquire information about the distance traveled per unit time by the transmitter 40, and eventually enables the output unit 332 to generate the adjustment information based on the information acquired by the acquisition unit 331 about the distance traveled per unit time by the transmitter 40.

For example, if the distance traveled per unit time by the transmitter 40 is equal to or greater than a predetermined threshold value, the location of the transmitter 40 is suitably estimated more accurately at shorter time intervals than when the distance traveled per unit time by the transmitter 40 is less than the threshold value.

In this case, the threshold value is set at a value greater than the distance traveled per unit time by the transmitter 40 when the user 1 stays still (e.g., seated) and smaller than the distance traveled per unit time by the transmitter 40 when the user 1 is walking. This allows the output unit 332 to determine that the user 1 who carries the transmitter 40 with him or her should be walking when finding the distance traveled per unit time by the transmitter 40 equal to or greater than the threshold value and that the user 1 who carries the transmitter 40 with him or her should stay still when finding the distance traveled per unit time by the transmitter 40 less than the threshold value. Also, when finding the distance traveled per unit time by the transmitter 40 equal to or greater than the threshold value, the output unit 332 generates adjustment information to set the time interval to transmit the wireless signal at a first time interval t1 and also set the transmission power at a first power value P1. On the other hand, when finding the distance traveled per unit time by the transmitter 40 less than the threshold value, the output unit 332 generates adjustment information to set the time interval to transmit the wireless signal at a second time interval t2 shorter than the first time interval t1 and also set the transmission power at a second power value P2 smaller than the first power value P1.

This makes, when the distance traveled per unit time by the transmitter 40 is equal to or greater than the threshold value, the time interval at which the transmitter 40 transmits the wireless signal shorter, and also makes the transmission power with which the transmitter 40 transmits the wireless signal greater, than when the distance traveled per unit time by the transmitter 40 is less than the threshold value. This allows the location of the transmitter 40 to be estimated more accurately at shorter time intervals. On the other hand, this makes, when the distance traveled per unit time by the transmitter 40 is less than the threshold value, the time interval at which the transmitter 40 transmits the wireless signal longer, and also makes the transmission power with which the transmitter 40 transmits the wireless signal smaller, than when the distance traveled per unit time by the transmitter 40 is equal to or greater than the threshold value. This allows the power consumption of the transmitter 40 to be cut down.

As can be seen, the output unit 332 is able to generate the adjustment information based on the distance traveled per unit time by the transmitter 40 and have an instruction signal including the adjustment information thus generated transmitted from the communications unit 31. This instruction signal is transmitted from the first communications unit 21 of the receiver 20 to the transmitter 40. This allows the control system 10 to adjust, according to the distance traveled per unit time by the transmitter 40 (i.e., the traveling velocity of the user 1 who carries the transmitter 40 with him or her), at least one of the time interval or transmission power at/with which the transmitter 40 transmits the wireless signal.

In the exemplary embodiment described above, only one transmitter 40 is provided. However, when a plurality of users 1 use the facility 100, there are a plurality of transmitters 40. In that case, identification information is assigned to each of the plurality of transmitters 40 and the wireless signal transmitted from each of the plurality of transmitters 40 includes the identification information.

This allows the acquisition unit 331 to acquire, based on the identification information included in the wireless signal, the location information about the source transmitter 40 that has transmitted the wireless signal, among the plurality of transmitters 40. This enables the server 30 to store the location information acquired by the acquisition unit 331 about the transmitter 40 in the storage unit 32 in association with the identification information of the transmitter 40. In addition, this also enables the server 30 to store history information, indicating the history of locational changes of each of the plurality of transmitters 40, in the storage unit 32. In this manner, the history information, indicating the history of locational changes of each of the plurality of transmitters 40, is stored in the storage unit 32. This allows the behavioral pattern of the user 1 who carries the transmitter 40 with him or her to be traced by reference to the history, stored in the storage unit 32, of locational changes of each transmitter 40. For example, this allows the output unit 332 to find, by reference to the history of locational changes on a transmitter 40 basis, the time when the user 1 who carries the transmitter 40 with him or her enters the room 101, the time when he or she leaves the room 101, and the time when he or she temporarily goes out of the room 101 for the purpose of having a break or a meal or attending a regular meeting, for example.

Then, the output unit 332 generates an instruction signal including the adjustment information by reference to the history of locational changes obtained, with respect to one of the plurality of transmitters 40 as a target of adjustment, from the location information, acquired by the acquisition unit 331 during a predetermined period, about the transmitter 40 as the target of adjustment. That is to say, the output unit 332 is able to trace the behavioral pattern of the user 1 who carries the transmitter 40 with him or her by reference to the history, stored in the storage unit 32, of the locational changes on a transmitter 40 basis. Then, by tracing the behavioral pattern of the user 1 who carries the transmitter 40 with him or her, the output unit 332 generates adjustment information in such a manner as to shorten the time interval to transmit the wireless signal, and increase the transmission power to transmit the wireless signal, during hours of the day when the user 1 is expected to enter or leave the room 101. The output unit 332 transmits an instruction signal including this adjustment information to the receiver 20 to make the first communications unit 21 of the receiver 20 forward the instruction signal to the transmitter 40 as a target of adjustment. This allows the location of the transmitter 40 to be estimated more accurately at shorter time intervals during those hours of the day when the user 1 who carries the transmitter 40 with him or her is expected to move.

On the other hand, by tracing the behavioral pattern of the user 1 who carries the transmitter 40 with him or her, the output unit 332 generates adjustment information in such a manner as to extend the time interval to transmit the wireless signal, and lower the transmission power to transmit the wireless signal, during hours of the day when the user 1 is expected to stay in the room 101. The output unit 332 transmits an instruction signal including this adjustment information to the receiver 20 to make the first communications unit 21 of the receiver 20 forward the instruction signal to the transmitter 40 as a target of adjustment. This allows the power consumption of the transmitter 40 to be cut down during those hours of the day when the user 1 who carries the transmitter 40 with him or her is expected to move only a little.

Furthermore, in the exemplary embodiment described above, the control system 10 instructs, based on the estimated location of the transmitter 40, the lighting control system 50 and the air conditioning control system 60 to operate in conjunction with each other. However, the lighting control system 50 and the air conditioning control system 60 do not have to operate in conjunction with each other.

(Resume)

As can be seen from the foregoing description, a control system (10) according to a first aspect includes a communications unit (21), an acquisition unit (331), and an output unit (332). The communications unit (21) communicates with a transmitter (40) that transmits a wireless signal. The acquisition unit (331) acquires location information about a location of the transmitter (40) based on the wireless signal that has been transmitted from the transmitter (40) and received by the communications unit (21). The output unit (332) has an instruction signal transmitted, in accordance with the location information acquired by the acquisition unit (331), from the communications unit (21) to the transmitter (40). The instruction signal includes adjustment information that is used to vary at least one of a time interval at which the transmitter (40) transmits the wireless signal or transmission power with which the transmitter (40) transmits the wireless signal.

This aspect allows at least one of a time interval at which the transmitter (40) transmits the wireless signal or transmission power with which the transmitter (40) transmits the wireless signal to be varied according to the location information acquired by the acquisition unit (331). Thus, a control system (10) with the ability to cut down the power consumption of the transmitter (40) may be provided by extending the time interval or lowering the transmission power.

In a control system (10) according to a second aspect, which may be implemented in conjunction with the first aspect, the location information includes information about a current location of the transmitter (40). The output unit (332) has the instruction signal transmitted, in accordance with the current location of the transmitter (40), from the communications unit (21) to the transmitter (40).

This aspect allows at least one of a time interval or transmission power at/with which the transmitter (40) transmits the wireless signal to be varied according to the current location of the transmitter (40). Thus, when the transmitter (40) is carried by the user (1) with him or her, at least one of a time interval or transmission power at/with which the transmitter (40) transmits the wireless signal may be varied according to the location of the user (1) who carries the transmitter (40) with him or her.

In a control system (10) according to a third aspect, which may be implemented in conjunction with the first aspect, the location information includes information about a distance traveled per unit time by the transmitter (40). The output unit (332) has the instruction signal transmitted, according to the distance traveled per unit time by the transmitter (40), from the communications unit (21) to the transmitter (40).

This aspect allows at least one of a time interval or transmission power at/with which the transmitter (40) transmits the wireless signal to be varied according to the distance traveled per unit time by the transmitter (40). Thus, when the transmitter (40) is carried by the user (1) with him or her, at least one of a time interval or transmission power at/with which the transmitter (40) transmits the wireless signal may be varied according to the traveling velocity of the user (1) who carries the transmitter (40) with him or her.

In a control system (10) according to a fourth aspect, which may be implemented in conjunction with any one of the first to third aspects, the transmitter (40) includes a plurality of transmitters (40). Identification information is assigned to each of the plurality of transmitters (40). The wireless signal transmitted from each of the plurality of transmitters (40) includes the identification information.

This aspect allows the location information to be acquired on a transmitter (40) basis in accordance with the identification information included in the wireless signal.

In a control system (10) according to a fifth aspect, which may be implemented in conjunction with the fourth aspect, the acquisition unit (331) acquires, based on the identification information included in the wireless signal, the location information about a source transmitter (40) that has transmitted the wireless signal. The source transmitter (40) is one of the plurality of transmitters (40). The output unit (332) has the instruction signal transmitted, according to a history of locational changes of an adjustment target transmitter (40) out of the plurality of transmitters (40), from the communications unit (21) to the adjustment target transmitter (40). The history of locational changes is obtained based on the location information, acquired by the acquisition unit (331) during a predetermined period, about the adjustment target transmitter (40).

This aspect allows an instruction signal to be transmitted, according to a history of locational changes on a transmitter (40) basis, to the adjustment target transmitter (40). Thus, when the transmitter (40) is carried by the user (1) with him or her, the instruction signal may be transmitted to the adjustment target transmitter (40) according to the history of locational changes during a predetermined period of the user (1) who carries the transmitter (40) with him or her.

A control program according to a sixth aspect is designed to cause a computer system to perform acquisition processing and output processing. The acquisition processing includes acquiring location information about a location of a transmitter (40) based on a wireless signal that has been transmitted from the transmitter (40) configured to transmit the wireless signal and received by a communications unit (21) configured to communicate with the transmitter (40). The output processing includes having an instruction signal transmitted, in accordance with the location information acquired through the acquisition processing, from the communications unit (21) to the transmitter (40). The instruction signal includes adjustment information that is used to vary at least one of a time interval at which the transmitter (40) transmits the wireless signal or transmission power with which the transmitter (40) transmits the wireless signal.

This aspect allows at least one of a time interval at which the transmitter (40) transmits the wireless signal or transmission power with which the transmitter (40) transmits the wireless signal to be varied according to the location information acquired through the acquisition processing. Thus, a control program that enables the power consumption of the transmitter (40) to be cut down may be provided by extending the time interval or lowering the transmission power.

A control method according to a seventh aspect includes acquisition processing and output processing. The acquisition processing includes acquiring location information about a location of a transmitter (40) based on a wireless signal that has been transmitted from the transmitter (40) configured to transmit the wireless signal and received by a communications unit (21) configured to communicate with the transmitter (40). The output processing includes having an instruction signal transmitted, in accordance with the location information acquired through the acquisition processing, from the communications unit (21) to the transmitter (40). The instruction signal includes adjustment information that is used to vary at least one of a time interval at which the transmitter (40) transmits the wireless signal or transmission power with which the transmitter (40) transmits the wireless signal.

This aspect allows at least one of a time interval at which the transmitter (40) transmits the wireless signal or transmission power with which the transmitter (40) transmits the wireless signal to be varied according to the location information acquired through the acquisition processing. Thus, a control method that enables the power consumption of the transmitter (40) to be cut down may be provided by extending the time interval or lowering the transmission power.

A transmitter (40) according to an eighth aspect is used in the control system (10) according to any one of the first to fifth aspects. The transmitter (40) includes a transmitter-end communications unit (41) and a control unit (42). The transmitter-end communications unit (41) communicates with the communications unit (21) of the control system (10). The control unit (42) varies, according to the adjustment information that the transmitter-end communications unit (41) has received from the control system (10), at least one of the time interval or the transmission power.

This aspect allows at least one of a time interval or transmission power to transmit the wireless signal to be varied according to the adjustment information received from the control system (10). Thus, the power consumption may be cut down when adjustment information for extending the time interval or lowering the transmission power has been received.

Note that these aspects are only exemplary aspects of the present disclosure. Various configurations (including their variations) for the control system (10) according to the embodiments described above may also be implemented, for example, as a control method, a control program to be executed by a computer system, or a non-transitory storage medium on which the control program is stored.

Also, the constituent elements according to the second to fifth aspects are not essential constituent elements for the control system (10) but may be omitted as appropriate.

REFERENCE SIGNS LIST

10 Control System
21 First Communications Unit (Communications Unit)
41 Transmitter-End Communications Unit
40 Transmitter
42 Control Unit
331 Acquisition Unit
332 Output Unit

The invention claimed is:

1. A control system comprising:
a communications unit configured to communicate with a transmitter, the transmitter being configured to transmit a wireless signal;
an acquisition unit configured to acquire location information about a location of the transmitter in a target area based on an installation position of the communications unit and a received signal strength indication of the wireless signal that has been transmitted from the transmitter and received by the communications unit, the location information including coordinates indicating the location of the transmitter;
an output unit configured to have an instruction signal transmitted, in accordance with the location information acquired by the acquisition unit, from the communications unit to the transmitter, the instruction signal including adjustment information used to vary at least one of a time interval at which the transmitter transmits the wireless signal or transmission power with which the transmitter transmits the wireless signal; and
an equipment control unit,
the target area including a first zone and a second zone,
the first zone including a third zone and a fourth zone, the third zone including an entrance between the first zone and the second zone, the fourth zone being other than the third zone in the first zone,
the equipment control unit being configured to make equipment provided for the first zone operate in accordance with the location information acquired by the acquisition unit,
the output unit being configured to adjust, in accordance with the coordinates indicating the location of the transmitter acquired by the acquisition unit, the time interval and the transmission power, depending on in which of the second, third and fourth zone the transmitter is currently located,
the output unit generating:
when finding the transmitter located in the third zone, adjustment information that sets the time interval at a first time interval and sets the transmission power at a first power value,
when finding the transmitter located in the second zone, adjustment information including at least one of a first adjustment information and a second adjustment information, the first adjustment information setting the time interval at a second time interval that is longer than the first time interval, the second adjustment information setting the transmission power at a second power value that is smaller than the first power value, and when finding the transmitter located in the fourth zone, adjustment information including at least one of a third adjustment information and a fourth adjustment information, the third adjustment information setting the time interval at a third time interval that is longer than the first time interval, the fourth adjustment information setting the transmission power at a third power value that is smaller than the first power value.

2. The control system of claim 1, wherein
the location information includes information about a current location of the transmitter, and
the output unit is configured to have the instruction signal transmitted, in accordance with the current location of the transmitter, from the communications unit to the transmitter.

3. The control system of claim 1, wherein
the location information includes information about a distance traveled per unit time by the transmitter, and
the output unit is configured to have the instruction signal transmitted, according to the distance traveled per unit time by the transmitter, from the communications unit to the transmitter.

4. The control system of claim 1, wherein
the transmitter includes a plurality of transmitters,
identification information is assigned to each of the plurality of transmitters, and
the wireless signal transmitted from each of the plurality of transmitters includes the identification information.

5. The control system of claim 4, wherein
the acquisition unit is configured to acquire, based on the identification information included in the wireless signal, the location information about a source transmitter that has transmitted the wireless signal, the source transmitter being one of the plurality of transmitters, and
the output unit is configured to have the instruction signal transmitted, according to a history of locational changes of an adjustment target transmitter out of the plurality of transmitters, from the communications unit to the adjustment target transmitter, the history of locational changes being obtained based on the location information, acquired by the acquisition unit during a predetermined period, about the adjustment target transmitter.

6. A non-transitory storage medium in which a control program is stored, the control program designed to cause a computer system to perform:

acquisition processing including acquiring location information about a location of a transmitter in a target area based on an installation position of a communications unit and a received signal strength indication of a wireless signal that has been transmitted from the transmitter configured to transmit the wireless signal and received by the communications unit configured to communicate with the transmitter, the location information including coordinates indicating the location of the transmitter;

output processing including having an instruction signal transmitted, in accordance with the location information acquired through the acquisition processing, from the communications unit to the transmitter, the instruction signal including adjustment information used to vary at least one of a time interval at which the transmitter transmits the wireless signal or transmission power with which the transmitter transmits the wireless signal; and control processing,
the target area including a first zone and a second zone,
the first zone including a third zone and a fourth zone, the third zone including an entrance between the first zone and the second zone, the fourth zone being other than the third zone in the first zone,
the control processing including making equipment provided for the first zone operate in accordance with the location information acquired by the acquisition processing,
the output processing including adjusting, in accordance with the coordinates indicating the location of the transmitter acquired by the acquisition processing, the time interval and the transmission power, depending on in which of the second, third and fourth zone the transmitter is currently located,
the output processing further including generating:

when finding the transmitter located in the third zone, adjustment information that sets the time interval at a first time interval and sets the transmission power at a first power value, when finding the transmitter located in the second zone, adjustment information including at least one of a first adjustment information and a second adjustment information, the first adjustment information setting the time interval at a second time interval that is longer than the first time interval, the second adjustment information setting the transmission power at a second power value that is smaller than the first power value, and when finding the transmitter located in the fourth zone, adjustment information including at least one of a third adjustment information and a fourth adjustment information, the third adjustment information setting the time interval at a third time interval that is longer than the first time interval, the fourth adjustment information setting the transmission power at a third power value that is smaller than the first power value.

7. A control method comprising:
acquisition processing including acquiring location information about a location of a transmitter in a target area based on an installation position of a communications unit and a received signal strength indication of a wireless signal that has been transmitted from the transmitter configured to transmit the wireless signal and received by the communications unit configured to communicate with the transmitter, the location information including coordinates indicating the location of the transmitter;

output processing including having an instruction signal transmitted, in accordance with the location information acquired through the acquisition processing, from the communications unit to the transmitter, the instruction signal including adjustment information used to vary at least one of a time interval at which the transmitter transmits the wireless signal or transmission power with which the transmitter transmits the wireless signal; and control processing,
the target area including a first zone and a second zone,
the first zone including a third zone and a fourth zone, the third zone including an entrance between the first zone and the second zone, the fourth zone being other than the third zone in the first zone, the control processing including making equipment provided for the first zone operate in accordance with the location information acquired by the acquisition processing, the output processing including adjusting, in accordance with the coordinates indicating the location of the transmitter acquired by the acquisition processing, the time interval and the transmission power, depending on in which of the second, third and fourth zone the transmitter is currently located, the output processing further including generating:
- when finding the transmitter located in the third zone, adjustment information that sets the time interval at a first time interval and sets the transmission power at a first power value,
- when finding the transmitter located in the second zone, adjustment information including at least one of a first adjustment information and a second adjustment information, the first adjustment information setting the time interval at a second time interval that is longer than the first time interval, the second adjustment information setting the transmission power at a second power value that is smaller than the first power value, and
- when finding the transmitter located in the fourth zone, adjustment information including at least one of a third adjustment information and a fourth adjustment information, the third adjustment information setting the time interval at a third time interval that is longer than the first time interval, the fourth adjustment information setting the transmission power at a third power value that is smaller than the first power value.

8. The control system of claim 2, wherein
the transmitter includes a plurality of transmitters,
identification information is assigned to each of the plurality of transmitters, and the wireless signal transmitted from each of the plurality of transmitters includes the identification information.

9. The control system of claim 3, wherein
the transmitter includes a plurality of transmitters,
identification information is assigned to each of the plurality of transmitters, and
the wireless signal transmitted from each of the plurality of transmitters includes the identification information.

10. The control system of claim 8, wherein
the acquisition unit is configured to acquire, based on the identification information included in the wireless signal, the location information about a source transmitter that has transmitted the wireless signal, the source transmitter being one of the plurality of transmitters, and the output unit is configured to have the instruction signal transmitted, according to a history of locational changes of an adjustment target transmitter out of the plurality of transmitters, from the communications unit to the adjustment target transmitter, the history of locational changes being obtained based on the location information, acquired by the acquisition unit during a predetermined period, about the adjustment target transmitter.

11. The control system of claim 9, wherein
the acquisition unit is configured to acquire, based on the identification information included in the wireless signal, the location information about a source transmitter that has transmitted the wireless signal, the source transmitter being one of the plurality of transmitters, and the output unit is configured to have the instruction signal transmitted, according to a history of locational changes of an adjustment target transmitter out of the plurality of transmitters, from the communications unit to the adjustment target transmitter, the history of locational changes being obtained based on the location information, acquired by the acquisition unit during a predetermined period, about the adjustment target transmitter.

* * * * *